United States Patent
Kemmochi et al.

(10) Patent No.: US 9,216,923 B2
(45) Date of Patent: Dec. 22, 2015

(54) METAL AND GRAPHITE MOLD AND METHOD OF MAKING A CRUCIBLE

(75) Inventors: Katsuhiko Kemmochi, Camas, WA (US); Larry Baer, Camas, WA (US); Carl Hagstrom, Camas, WA (US)

(73) Assignee: Shin-Etsu Quartz Products Co., Ltd., Tokyo (JP)

( * ) Notice: Subject to any disclaimer, the term of this patent is extended or adjusted under 35 U.S.C. 154(b) by 952 days.

(21) Appl. No.: 13/189,897

(22) Filed: Jul. 25, 2011

(65) Prior Publication Data

US 2013/0025319 A1 Jan. 31, 2013

(51) Int. Cl.
 *C03B 19/04* (2006.01)
 *C03B 19/09* (2006.01)

(52) U.S. Cl.
 CPC .................... *C03B 19/095* (2013.01)

(58) Field of Classification Search
 CPC ........ C30B 15/10; C30B 35/00; C30B 15/12; C30B 35/002; C03B 19/095
 USPC ............. 65/302, 71, 144, 134.7; 117/31, 220; 264/114, 123, 125
 See application file for complete search history.

(56) References Cited

U.S. PATENT DOCUMENTS

| | | | | |
|---|---|---|---|---|
| 4,632,686 | A * | 12/1986 | Brown et al. | 65/17.3 |
| 4,963,178 | A * | 10/1990 | Brown et al. | 65/144 |
| 5,989,021 | A * | 11/1999 | Sato et al. | 432/264 |
| 6,136,094 | A * | 10/2000 | Yamaji et al. | 117/200 |
| 7,383,696 | B2 * | 6/2008 | Kemmochi et al. | 65/60.1 |
| 2002/0166341 | A1* | 11/2002 | Shelley et al. | 65/17.3 |
| 2005/0120945 | A1* | 6/2005 | Hansen | 117/15 |
| 2007/0051296 | A1* | 3/2007 | Kemmochi et al. | 117/13 |
| 2007/0102133 | A1* | 5/2007 | Kemmochi et al. | 164/335 |
| 2009/0041960 | A1* | 2/2009 | Kemmochi et al. | 428/34.4 |
| 2009/0084308 | A1* | 4/2009 | Kishi et al. | 117/13 |
| 2009/0173276 | A1* | 7/2009 | Satou | 117/208 |
| 2010/0154701 | A1* | 6/2010 | Kemmochi et al. | 117/208 |
| 2011/0143063 | A1* | 6/2011 | Yamagata et al. | 428/34.6 |

* cited by examiner

*Primary Examiner* — Richard Crispino
*Assistant Examiner* — Yana B Krinker
(74) *Attorney, Agent, or Firm* — Michael Best Friedrich LLP

(57) ABSTRACT

A mold for making a fused silica crucible includes a cylindrical can having an interior bore. A graphite insert is received in the bore and has an upper surface adapted to form the lower surface of the crucible while the interior bore of the can forms the side wall of the crucible. Silica grain is deposited in the mold while it rotates. Bores formed in the can above the insert and in the insert draw air through the silica during fusion.

9 Claims, 5 Drawing Sheets

METAL AND GRAPHITE MOLD AND METHOD OF MAKING A CRUCIBLE

BACKGROUND OF THE INVENTION

1. Field of the Invention

The present invention relates to the field of silica crucibles and more particularly molds in which such crucibles are made and methods for their manufacture.

2. Description of the Related Art

Silicon wafers used in the semiconductor industry are made from ingots of single crystalline silicon. Such ingots are generally manufactured using the Czochralski (CZ) process. In the CZ process, metallic silicon is charged in a silica glass crucible housed within a susceptor that is received in a crystal growth chamber. A heater surrounding the susceptor heats the charge thus melting the silicon. A single silicon crystal is then pulled from the melt at or near the melting temperature of silicon.

The crucibles used for this process have rounded bottoms and a cylindrical wall, which are supported by the susceptor during the CZ process. They are made using rotating graphite molds that have air channels communicating with the interior of the mold at the sides and bottom thereof. While the mold rotates, high quality silica grain is distributed over the surface of the mold and shaped in a known manner. Electrodes are then lowered into the mold, and power in the range of 300 KVA to 1200 KVA is applied, thus creating ball of plasma gas. The heat so generated fuses the silica in the shape of a crucible suitable for use with the CZ process.

The graphite mold, or insert, used to make such crucibles is received in a metal container known in the industry as a can. The insert is cylindrical in shape with an outer cylindrical wall sized to be received in the can. The graphite insert includes a mold cavity having a rounded lower portion for shaping the lower end of the crucible and a cylindrically shaped inner wall surface for shaping the upright crucible wall. The air channels mentioned above communicate with the surface of the mold cavity.

Creation of the graphite insert is complex and expensive. It is made from slurry that is purified, heat treated, and shaped into a cylindrical blank in an isostatic press. For some crucibles, the blank must have a 36-inch diameter. The height required for some of the larger graphite molds is limited by the capabilities of the press. The graphite blank so formed is then machined to shape the cavity in which the crucible is formed as well as the air channels.

On one hand, graphite is a desirable substance to use as a crucible mold because it can be relatively easily shaped in the form necessary to mold the crucible. And it is better suited than some materials to withstand the heat generated by the plasma gas and the silica during the fusion process. On the other hand, it wears more quickly than metal and so becomes worn and must be periodically replaced. Metal, though, is very difficult to shape in the form needed to mold the crucible. The best approach known to date is to use the easily machined graphite while accepting that it must be frequently replaced due to its high rate of wear.

Another drawback of graphite compared to metal is that graphite takes longer to cool down than metal. This slows down crucible throughput and increases cost of production. Because there is a space between the exterior portion of the graphite mold and the can, air in that space acts as an insulator, which retains heat, i.e., slows cooling after fusion is complete.

Finally, fusion of the crucible proceeds from the radially innermost layer of silica to the radially outermost layer. Before the innermost layer fuses, gas is drawn through the silica and into the air channels in the graphite mold by a vacuum pump. Once the innermost layer fuses, the vacuum draws air only through the uppermost portion of the shaped silica about its periphery. This creates a strong flow of air in the silica grain layer between the fused crucible surface and the surface of the mold cavity. The flow is from the very top of the silica and into the air channels formed in the side and bottom of the mold.

While this flow is needed to remove gasses and prevent bubbles as described above, it also creates a lot of wear to the graphite mold. Such wear occurs around the periphery at the top. In addition, channels form on the mold surface as a result of gas flow down to the air channel bores in the mold. These channels form vertical grooves that extend upwardly from the bores formed on the side wall of the graphite mold.

DETAILED DESCRIPTION

Figure 1:
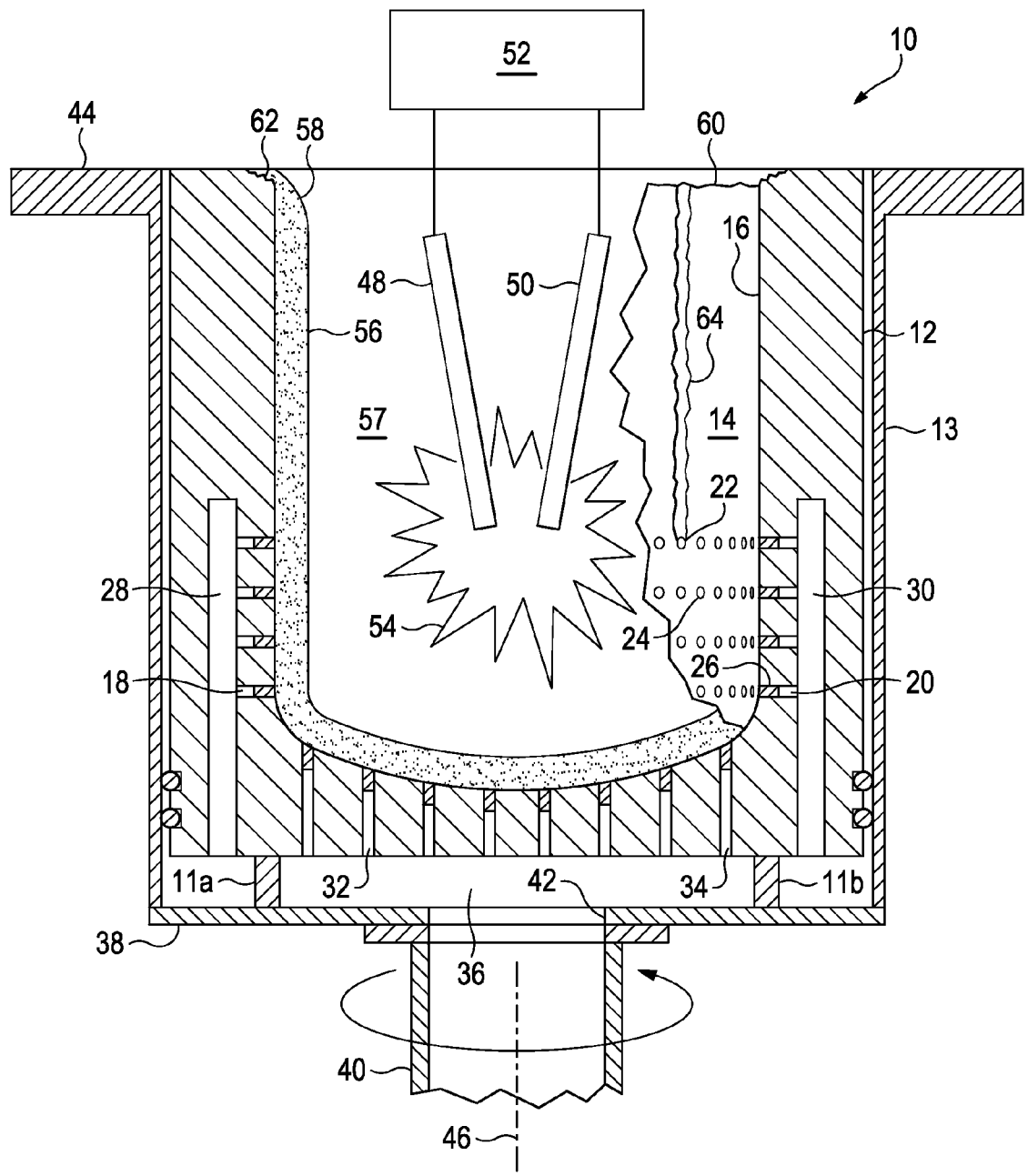
FIG. 1 is a schematic, cross-sectional view of a prior art mold during production of a silica crucible.

Turning attention now to FIG. 1, indicated generally at 10 is a prior art system for fusing a silica crucible in accordance with the present invention. The system includes a mold 12 having an inner mold surface 14. Mold 12 is received within a cylindrical can 13. Studs 11a, 11b, placed at the bottom of can 13 support and locate mold 12 within the can. Mold surface 14 is formed on a substantially cylindrical vertical wall 16. In the mold of FIG. 1, wall 16 defines a cylindrical cavity having a diameter of about 620 mm, but the invention may be equally well practiced with molds having both smaller and larger diameters. O-rings 17a, 17b create a gas seal between can 13 and mold 14 about the periphery of each.

A plurality of air channels, like air channels 18, 20 communicate with inner mold surface 14. Each air channel comprises a cylindrical bore that creates a circular opening, like openings 22, 24, on mold surface 14. Each air channel, like channel 20, includes a porous graphite plug, like plug 26, which prevents silica from being drawn from the mold cavity into the air channels. The air channels, like channels 18, 20, communicate with manifolds 28, 30, respectively.

Air channels 18, 20 form part of a circle of air channels about the wall of mold 12. Additional circles of air channels are formed above the circle that contains channels 18, 20. Additional air channels, like channels 32, 34 are formed on the bottom of mold 12. Like the other air channels, each one includes a plug, like plug 26, which is permeable to gas but stops silica grain. Air channels 32, 34 are also contained within a circle (as viewed from the top of mold 12) with additional air channels being included in a circle radially outward from the one containing channels 34, 34, and in circles radially inwardly therefrom as shown.

The air channels, like channels 32, 34, that communicate with the bottom of mold 12 also communicate with a manifold 36 formed between the lower surface of mold 12 and a bottom 38 of can 13. Manifolds 28, 30 also communicate with manifold 36.

Can 13 also includes a pipe 40 that communicates with a bore 42 formed in can bottom 38. As a result, manifolds 28, 30, 38 are all in communication with the interior of pipe 40. Finishing now the description of can 13, a flange 44 extends around the upper perimeter of the can. The flange is used to connect can 13 to a conventional water jacket (not shown). Water runs through the jacket and contacts can 13. This prevents the temperature of mold 12 and can 13 from becoming too hot during fusion.

The water jacket is filled with water and is mounted on a rotatable platform (also not shown). In operation, mold 12 is placed into can 13 as shown. Can 13 is then lowered into the water jacket in which water circulates. Pipe 40 is sealed with the water jacket and extends therefrom. It is connected to a vacuum pump (not visible in the drawings). The pump is configured to draw air from the mold cavity via the air channels, the manifolds, and ultimately through bore 40 and out of system 10. The pump typically has a capacity of between about 80 and 350 cubic meters per hour, although the invention may be practiced with pumps outside this range depending on the conductivity of the channels, bores, manifolds, valves, and other structure disposed between mold surface 14 and the pump.

The platform (not shown) that supports can 13 can be rotated by a motor (not visible) about a vertical axis 46. A set of conventional electrodes 48, 50 is connected to a conventional DC power supply 52 that can apply power to the electrodes in a selectable range between about 300 KVA and 1200 KVA. When sufficient power is applied to electrodes 48, 50, an extremely hot plasma gas ball 54 forms around the electrodes.

Mold 12 contains a layer 56 of silica shaped in the form a crucible. Layer 56 is shown partially broken away to expose mold surface 14. A radially inner surface 57 of layer 56 forms the radially inner surface of a crucible when the silica fuses.

Generally describing the operation of system 10, natural silica grain is placed in mold 12 as it rotates about axis 46. As used herein, the term silica may refer to natural or synthetic silica, to amorphous or crystalline silica, to such silica doped with any dopant, or to any granular material from which a crucible could be sintered or fused. The grain is placed in the mold in a known manner with the centrifugal force produced by mold rotation keeping the grain against the interior mold cavity. Also in a known manner, before electrodes 48, 50 are lowered into the mold cavity, the grain is formed into the shape of a crucible as shown. Once all the grain is received in the mold and formed into the shape shown in FIG. 1, electrodes 48, 50 are positioned as shown in FIG. 1, power is applied, and the pump (not visible) is turned on. Once the plasma gas 54 heats the grain to the point were the grains on the innermost surface 57 of layer 56 begin to fuse, a fusion front forms and proceeds over time from the innermost surface of the crucible to near mold surface 14, where the fusion front saturates.

Just before fusion begins on the radially inner surface 57 of layer 56, vacuum pump draws the ambient atmosphere into the mold bores, like bores 18, 20, 32; into manifolds 28, 30, 36; into pipe 40; and from there discharges to the atmosphere, typically through a filtration system. As used herein, the term gas may refer to this ambient atmosphere and to released gas from the melting silica.

As fusion begins in different places on the radially inner surface 57 of layer 56, the pressure drop between the atmosphere and the pressure in the manifolds begins to increase. As fusion continues, radially inner surface 57 ultimately fuses over completely, and the gas drawn through the silica is limited to gas being drawn into an upper surface 58 of layer 56. As fusion continues further, this gas flow is progressively limited to a diminishing layer of unfused silica that lies against mold surface 14. As a result, a large volume of gas is limited to flow between the fused portion of layer 56 and surface 14 of the mold. This flow selectively erodes the surface of mold 12. For example, flow over a shoulder 60 of the mold between upper surface 58 and mold surface 14 wears shoulder 60 as shown. A cross-sectional portion 62 of the shoulder is also visible in FIG. 1.

Additional eroded areas occur in grooves worn above each bore. To retain clarity in the drawing, only one such groove is illustrated, namely groove 64. These grooves also result from the gas flow path being progressively limited to a diminishing layer of unfused silica that lies against mold surface 14. The large gas volume and fast flow rate has the effect of eroding—essentially by sand blasting—shoulder 60 and groove 64.

Figure 2:
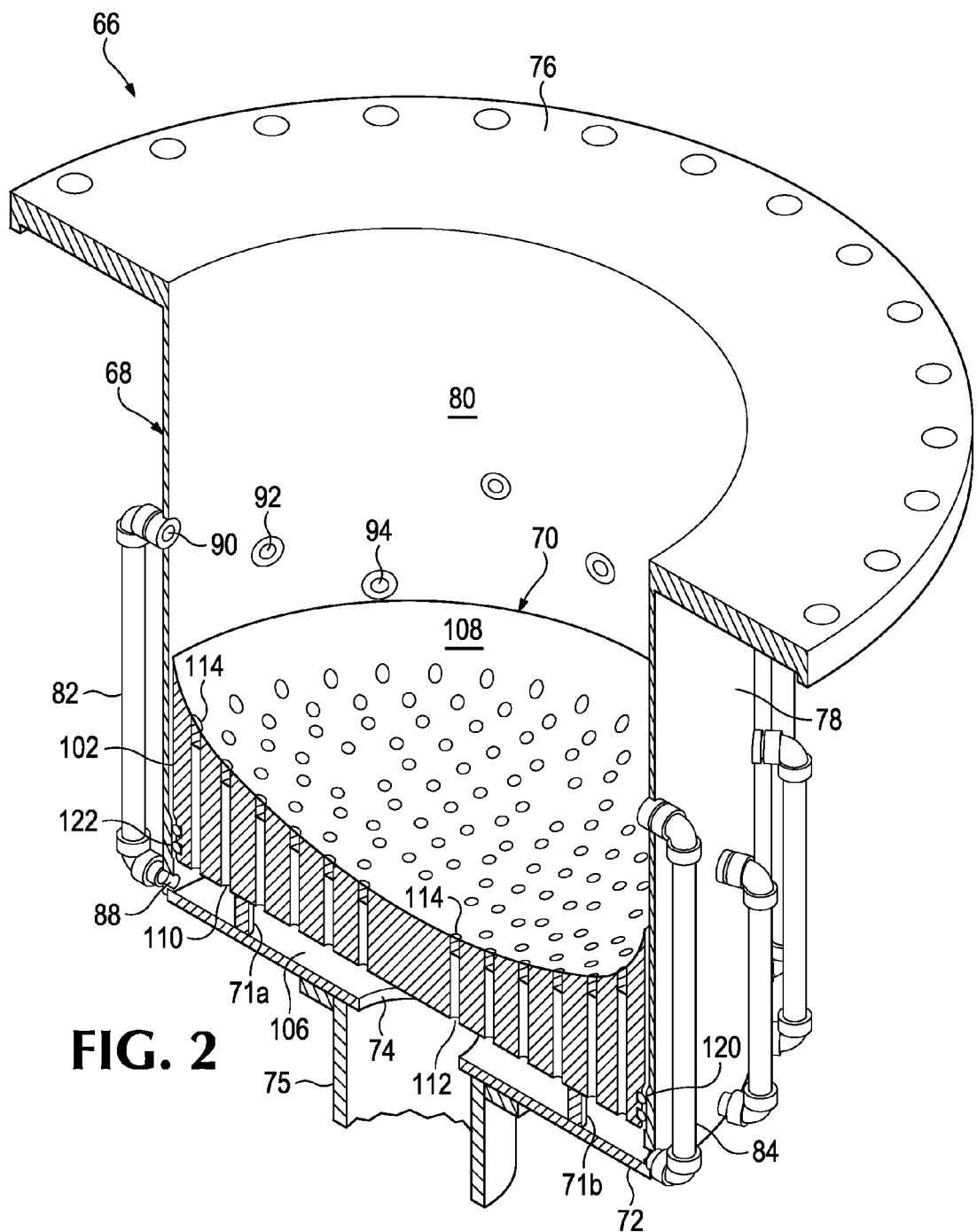
FIG. 2 is a perspective, cross-sectional view of a mold according to the principles of the present invention.
Figure 3:
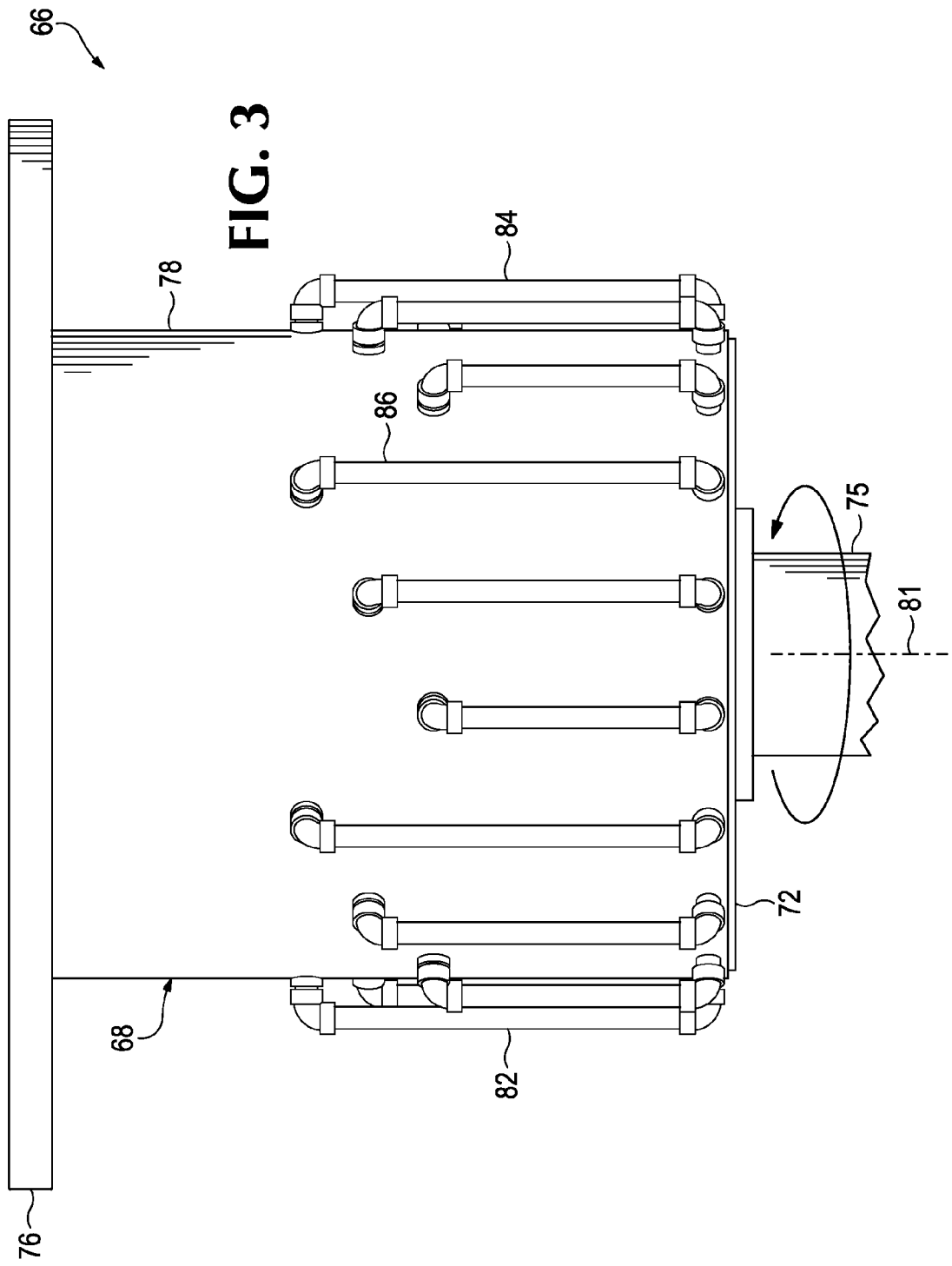
FIG. 3 is an elevational view of the mold of FIG. 2.
Figure 4:
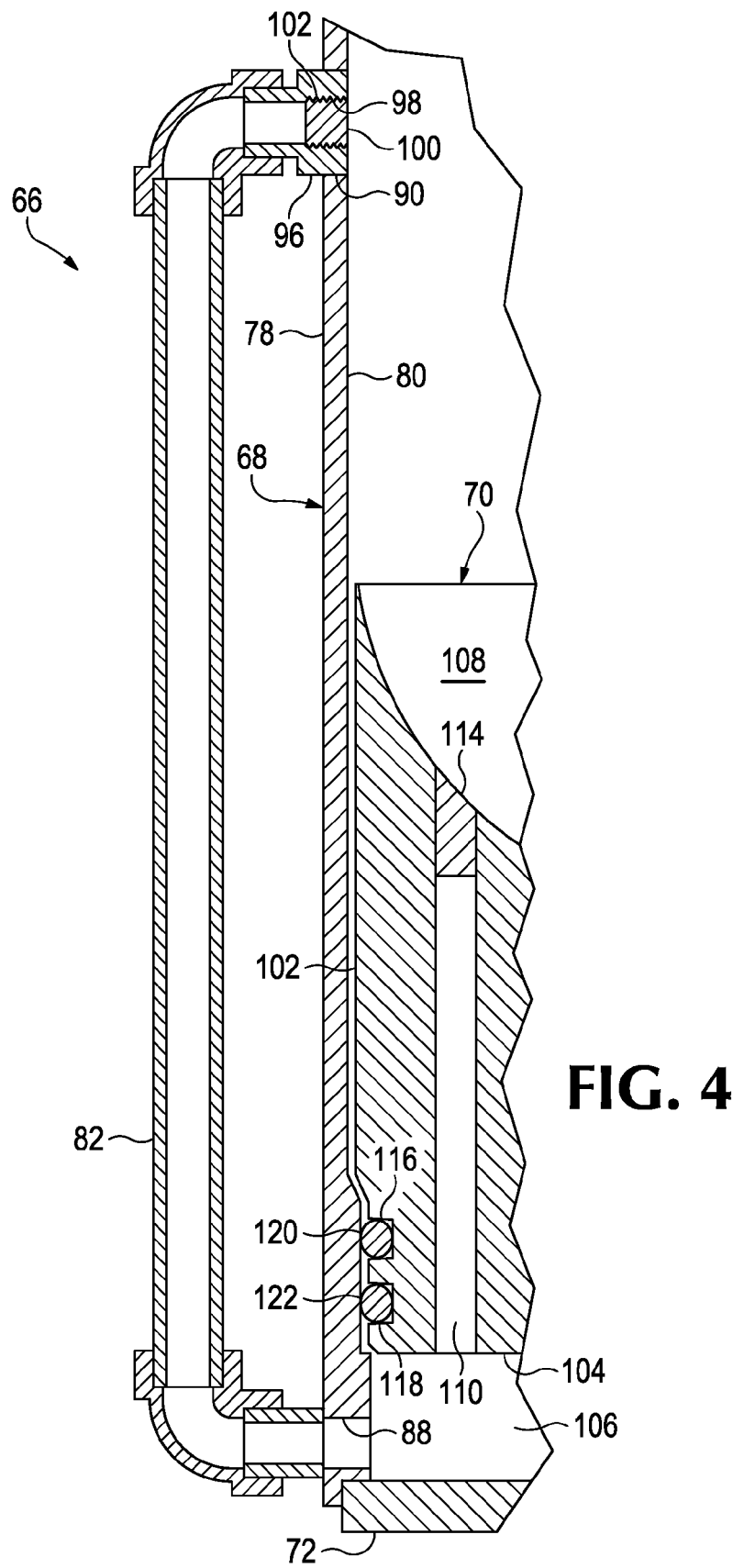
FIG. 4 is an enlarged, partial, cross-sectional view of a portion of the view of FIG. 3.

Turning now to FIG. 2-4, indicated generally at 66 is a mold constructed in accordance with the present invention. Mold 66 includes a cylindrical can 68, also referred to herein as a metal container, and a graphite insert 70, also referred to herein as a graphite base. Studs 71a, 71b support and locate insert 70 within can 68. The can is made from steel, which is preferably heat resistant and stainless steel. A Ni—Cr—Fe alloy like SUS 304 or SUS 316 is well suited to make can 68. The can includes a bottom 72 having an opening 74 formed therein. Bottom 72 connects to a pipe 75 over opening 74. A flange 76 extends about the perimeter of the upper portion of the can. The can includes a cylindrical wall 78 that defines an interior bore 80. Can 68 is receivable in a conventional water jacket (not shown to reveal the can). The water jacket is mounted on a rotatable platform (not shown). When the can, the insert, and the water jacket are assembled as the can and insert are shown in FIG. 2, they may be rotated about an axis 81. As in the prior art, a vacuum pump (not shown) draws air downwardly in pipe 75.

Pipes, like pipes 82, 84, 86 are each connected to wall 78 at a first plurality of bores, like bore 88 at the lower end of pipe 82, and at a second plurality of bores, like bore 90 at the upper end of pipe 82, and like bores 92, 94. The pipes are also referred to herein as conduits. A fitting 96 (best viewed in FIG. 4) is received within bore 90 and includes a threaded bore 98. A porous graphite plug 100 is generally cylindrical in shape and includes threads 102 formed on the radially outer surface thereof. Threads 102 are threadably engaged with threaded bore 98. Each of the other bores, like bores 92, 94, formed in can 68 include a similar porous graphite plug, like plug 100. Although plug 100 is shown threadably engaged with fitting 96, the invention could also be implemented by press fitting plugs into the fitting or the can bores.

Considering now the structure of graphite insert 70, the insert includes a substantially cylindrical upright wall 102 and a substantially planar lower surface 104. A plenum 106, also referred to herein as a space, is formed between bottom 72 of can 68 and surface 104 on insert 70. The insert has a curved upper surface 108 that is shaped to form a corresponding lower surface of a crucible formed in mold 66, as will soon be seen.

A plurality of bores, like bores 110, 112, extends between upper surface 108 and lower surface 104. Each of the bores includes a porous graphite plug, like plug 114, which is press fit in the bore. A pair of annular channels 116, 118 extends about the circumference of insert 70 and receives O-rings 120, 122, respectively, to seal between the insert and can 68.

In the present implementation, graphite insert 70 is approximately 24 inches across and is designed to produce a crucible having a 610 mm outside diameter. Surface 108 has two different curvature radii. The first, in the central portion of surface 108 is a partial sphere. The second, at the periphery of surface 108 is a partial torus. The latter radius of curvature extends to the intersection of surface 108 with wall 102. The insert at wall 102 is about 9.4 inches tall. These dimensions are exemplary for the present embodiment; the invention may be implemented with the insert and can be formed in many different sizes and proportions.

Figure 5:
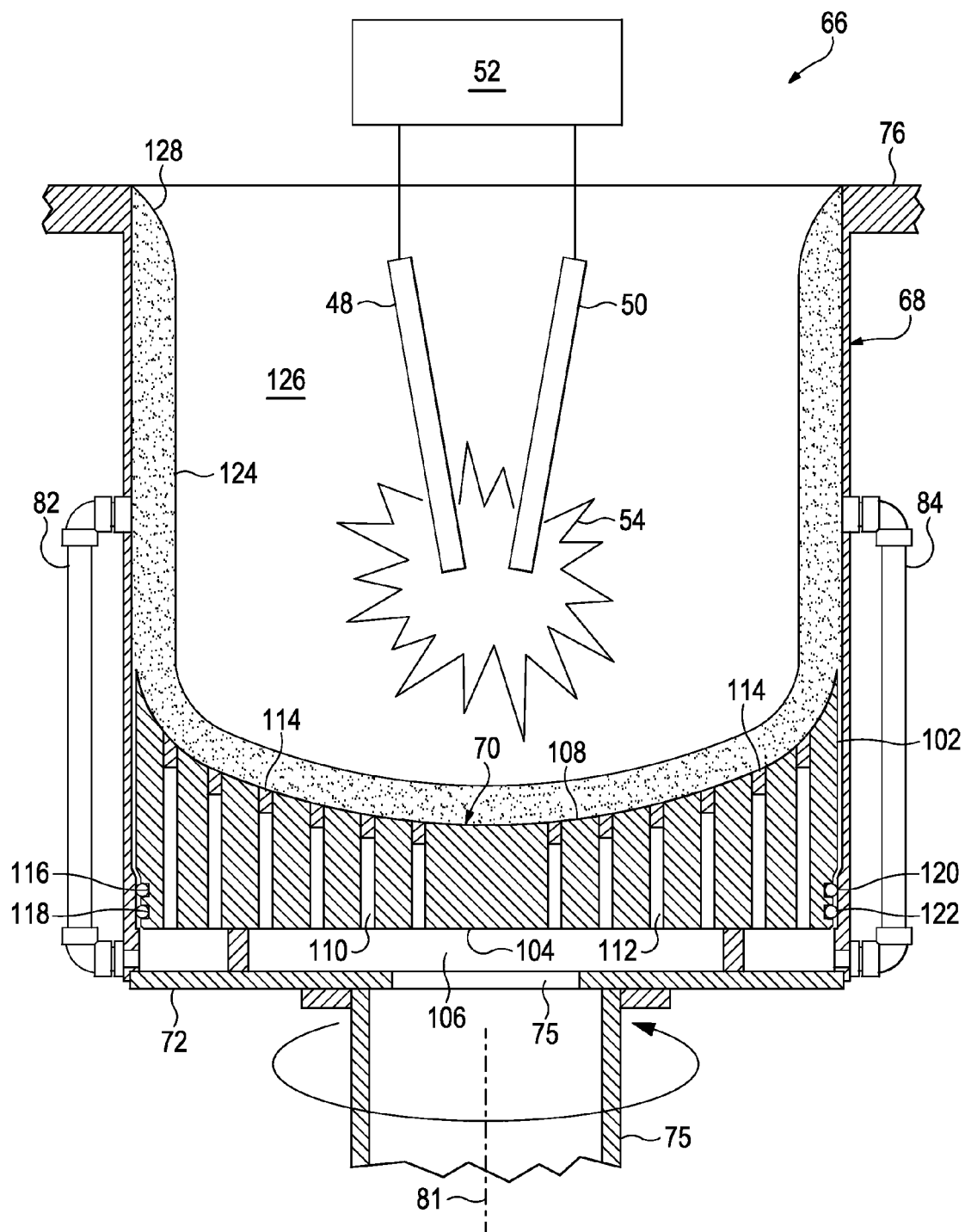
FIG. 5 is a slightly enlarged, cross-sectional view of the mold of FIG. 2 having a layer of silica formed therein.

Turning to FIG. 5, consideration will now be given to how the present embodiment is used to make a crucible. Structure that has been previously identified retains the same numeral in FIG. 5. As in previous views, the conventional water jacket, in which can 68 is received, is not shown to reveal structure of the current embodiment.

First, the components are assembled as shown in FIGS. 2-4. Next, the assembled structure is rotated about axis 81, and high quality silica grain is deposited into mold 66 and shaped in a conventional manner into a layer 124 (in FIG. 5). After the grain is shaped into the form desired for the crucible, a vacuum pump (not visible) applies a vacuum to pipe 75, and power supply 52 is activated to generate plasma gas ball 54. In any event, fusion of the silica grain begins first on a radially inner surface 126 of grain layer 124.

At about the same time, ambient atmosphere is drawn through layer 124; through porous graphite plugs in the insert 70, like plug 114; through the bores, like bores 110, 112, into plenum 106; into pipe 75; and from there into the atmosphere, typically via an air filtration system (not visible).

While ambient atmosphere is being so drawn, it is also being drawn through layer 124; through porous graphite plugs in the fittings, like plug 100 in fitting 96; through the pipes, like pipes 82, 84, 86, into plenum 106; into pipe 75; and from there into the atmosphere via the air filtration system.

As fusion progresses, eventually the entire surface 126 is fused, and a fusion front proceeds from surface 126 toward bore 80 in the can. After the surface is so fused, the atmosphere can enter layer 124 only through an upper surface 128 thereof. Flow travels down the grain and into the bores in can 68, like bores 90, 92, 94, as well as into bores in graphite insert 70, like bores 110, 112. It can be appreciated that after surface 126 fuses, there is a substantial flow rate between the radially inner wall of can 68 and fused surface 126. This, however, does not create undue wear on the can because it is steel. When the flow arrives at the radially outer portion of graphite insert 70, the flow rate is reduced from that above the insert. As a result, the insert is protected from the fastest, and therefore most erosive, gas flow.

As in the prior art, the graphite plugs in both the can bores and the insert bores act as filters to keep silica from being drawn into the vacuum system. The threaded silica plugs are substantially secured in their respective fittings as a result of the threaded connection between the two.

By positioning the bores in the graphite insert and the bores in the can, each with its corresponding pipe, flow through the silica grain can be designed in any manner, including corresponding to prior art molds, like the one in FIG. 1, in which all of the bores are formed in a full-size graphite insert.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. A mold for making a fused silica crucible having a substantially cylindrical side wall comprising:
   a cylindrical can having an interior bore, the interior bore constructed and arranged to form the substantially cylindrical side walls;
   a graphite insert received in the can, the insert having an upper surface adapted to form a lower region of the crucible;
   a plenum formed between the lower end of the insert and the bottom of the can;
   a first plurality of bores formed around the periphery of the can and communicating with the plenum;
   a second plurality of bores formed around the periphery of the can and communicating with the interior thereof above the insert;
   a third plurality of bores formed in the insert between the upper surface and the plenum;
   a plurality of conduits, each conduit of the plurality of conduits connecting a bore of the first plurality of bores with a bore of the second plurality of bores thereby providing communication between the plenum and the interior of the can above the insert; and
   a seal formed between the insert and the can.

2. The mold of claim 1 wherein a vacuum pump applies a vacuum to the plenum during formation of a fused silica crucible and wherein the first, second and third plurality of bores are adapted to draw gas through silica received in the mold via the first, second and third plurality of bores.

3. The mold of claim 2 wherein the can further includes a flange adapted to connect to a container of liquid for cooling the mold during fusion of a crucible.

4. The mold of claim 3 wherein the third plurality of bores are substantially vertically oriented.

5. The mold of claim 4 wherein the first and second plurality of bores are substantially horizontally oriented.

6. A rotatable mold for making a fused silica crucible comprising:
   a metal portion shaped to form a substantially cylindrical upper wall of a crucible;
   a graphite portion shaped to form a lower portion of the crucible;
   a plurality of bores formed in the metal portion and in the graphite, the bores constructed and arranged to draw gas through silica during fusion of the crucible; and
   a plurality of conduits connected to an exterior portion of the metal portion for drawing gas through at least some of the plurality of bores during fusion of the crucible.

7. The mold of claim 6 wherein the metal portion comprises a substantially cylindrical can and wherein the graphite portion comprises an insert received in a lower portion of the can.

8. The mold of claim 6 wherein one end of at least some of the plurality of conduits is in communication with a can bore and the other end is in communication with a plenum formed in the can beneath the insert.

9. The mold of claim 6 further comprising a seal formed between the metal portion and the graphite portion.

* * * * *